(12) United States Patent
Chen

(10) Patent No.: US 9,886,030 B2
(45) Date of Patent: Feb. 6, 2018

(54) SYSTEM FOR REAL-TIME MONITORING CARRIERS

(71) Applicant: Lumiplus Technology (Suzhou) Co., Ltd., Taicang (CN)

(72) Inventor: Shun-Yi Chen, Taipei (TW)

(73) Assignee: LUMIPLUS TECHNOLOGY (SUZHOU) CO., LTD., Taicang (CN)

( * ) Notice: Subject to any disclaimer, the term of this patent is extended or adjusted under 35 U.S.C. 154(b) by 0 days.

(21) Appl. No.: 15/134,880

(22) Filed: Apr. 21, 2016

(65) Prior Publication Data

US 2017/0269584 A1    Sep. 21, 2017

(30) Foreign Application Priority Data

Mar. 15, 2016   (TW) .............................. 105107943 A

(51) Int. Cl.
   *G05D 1/00* (2006.01)
   *G08C 17/02* (2006.01)
   *G08B 5/22* (2006.01)
   *H04N 5/232* (2006.01)

(52) U.S. Cl.
   CPC .......... *G05D 1/0016* (2013.01); *G05D 1/0022* (2013.01); *G08B 5/224* (2013.01); *G08C 17/02* (2013.01); *H04N 5/23206* (2013.01); *G05D 2201/0203* (2013.01); *G08C 2201/93* (2013.01)

(58) Field of Classification Search
   CPC ............... G05D 1/0016; G05D 1/0022; G05D 2201/0203; G08B 5/224; G08C 17/02; G08C 2201/93; H04N 5/23206
   See application file for complete search history.

(56) References Cited

U.S. PATENT DOCUMENTS

2006/0048800 A1* 3/2006 Rast .......................... A47L 1/02
                                                                134/56 R
2014/0207282 A1* 7/2014 Angle ................... H04L 12/282
                                                                700/257

* cited by examiner

*Primary Examiner* — Yuen H Wong
(74) *Attorney, Agent, or Firm* — WPAT, PC

(57) ABSTRACT

A system for real-time monitoring carriers includes a carrier, a process device and a portable wireless communication apparatus. The carrier is disposed in the monitored area. The carrier includes a camera module to capture images of the monitored area. The process device is electrically connected to the carrier via wireless transmission. The portable wireless communication apparatus manipulates the carrier through the process device.

8 Claims, 3 Drawing Sheets

SYSTEM FOR REAL-TIME MONITORING CARRIERS

This application claims the benefit of Taiwan Patent Application Serial No. 105107943, filed Mar. 15, 2016, the subject matter of which is incorporated herein by reference.

BACKGROUND OF INVENTION

1. Field of the Invention

The invention relates to a carrier system, and more particularly to the system for real-time monitoring carriers.

2. Description of the Prior Art

In the past decade, various robotic technologies such as artificial intelligence, sensing techniques and the like have been developing rapidly. In particular, it implies that an era of service robots is coming. Many major industrial countries and prediction organizations have expressed their optimistic views thereupon. Actually, the robotic technologies have been treated as killer applications for the next industrial trend.

In domestic service, the robotic cleaner for indoor cleaning, developed from a vacuum cleaning apparatus, can move or "walk" to clean the floor automatically. While in operations, the robotic cleaner can suck dusts and particles on the floor, and can turn back to a station for an idle state or for charging. In addition, in the art of vacuum cleaning, a popular handhold vacuum apparatus is also developed recently, whose cleaning methodology is pretty resembled to that of the robotic cleaner (one of self-propelled apparatuses).

With technologies progress day by day, ordinary tasks to be handled become huge and complicated. However, time demanded for resolution goes to be shorter and shorter. Therefore, more efficient and improved tools are needed for people to better take care of their tasks, especially versatile tasks at the same time.

In view of current art, though a remote-controlled self-propelled apparatus can be assigned to automatically perform domestic cleaning at specific location, and the environment around the self-propelled apparatus can be monitored through camera devices on the self-propelled apparatus or at some relevant places at that location, yet it is the limit that the conventional self-propelled apparatus can't report the real-time work status to the user. Namely, the real-time environment state around the working self-propelled apparatus can't be reported to the necessary personal in time. Thus, if any emergency occurs to the self-propelled apparatus or the instant work environment, no in-time information can make known to the necessary personal. Obviously, usage convenience of the conventional self-propelled apparatus is a problem. Hence, it is definitely that some improvements upon the conventional self-propelled apparatus shall be necessary.

SUMMARY OF THE INVENTION

Accordingly, it is the primary object of the present invention to provide a system for real-time monitoring carriers that at least one carrier can perform controlling, alerting and monitoring in a real-time manner via a portable wireless communication apparatus.

In the present invention, the system for real-time monitoring carriers, applied to monitor a monitored area, includes a carrier, a process device and a portable wireless communication apparatus. The carrier located in the monitored area further includes a camera module for capturing images of the monitored area. The process device is electrically coupled with the carrier via wireless transmission. The portable wireless communication apparatus electrically coupled with process device via wireless transmission applies the process device to manipulate the carrier.

In one embodiment of the present invention, the portable wireless communication apparatus applies the process device to issue one of a move signal and a termination signal to the carrier; wherein, when the carrier receives the move signal, the process device drives the carrier to walk; wherein, when the carrier receives the termination signal, the process device controls the carrier to stop.

In one embodiment of the present invention, when the carrier stops, the process device accesses the images of the monitored area captured by the camera module.

In one embodiment of the present invention, the system for real-time monitoring carriers further includes a charging station. The portable wireless communication apparatus applies the process device to issue a turn-back signal to the carrier for driving the carrier to turn back to the charging station.

In one embodiment of the present invention, the portable wireless communication apparatus applies the process device to issue a recording signal to the carrier for driving the camera module of the carrier to capture images.

In one embodiment of the present invention, the carrier includes a transceiver module for selectively issuing one of a power command, a charging command, an image command and an error command to the portable wireless communication apparatus.

In one embodiment of the present invention, when the portable wireless communication apparatus receives the image command, the portable wireless communication apparatus displays the images of the monitored area captured by the camera module.

In one embodiment of the present invention, the carrier includes a detection module for monitoring an environment state of the monitored area and for sending environment-monitoring information to the process device, the process device further storing the environment-monitoring information to the portable wireless communication apparatus.

In one embodiment of the present invention, the carrier includes an appliance-controlling unit, the portable wireless communication apparatus issuing and sending a manipulation command to the carrier via the process device so as to activate the appliance-controlling unit of the carrier.

In one embodiment of the present invention, the carrier includes a message-alerting module, the portable wireless communication apparatus issuing and sending a message-alerting command to the carrier via the process device so as to activate the message-alerting module of the carrier.

By providing the system for real-time monitoring carriers of the present invention, the portable wireless communication apparatus can be used to manipulate the carrier, and information of the carrier can be transmitted to the portable wireless communication apparatus through the process device, such that bidirectional communication for real-time monitoring can be achieved.

All these objects are achieved by the system for real-time monitoring carriers described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a system for real-time monitoring carriers. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
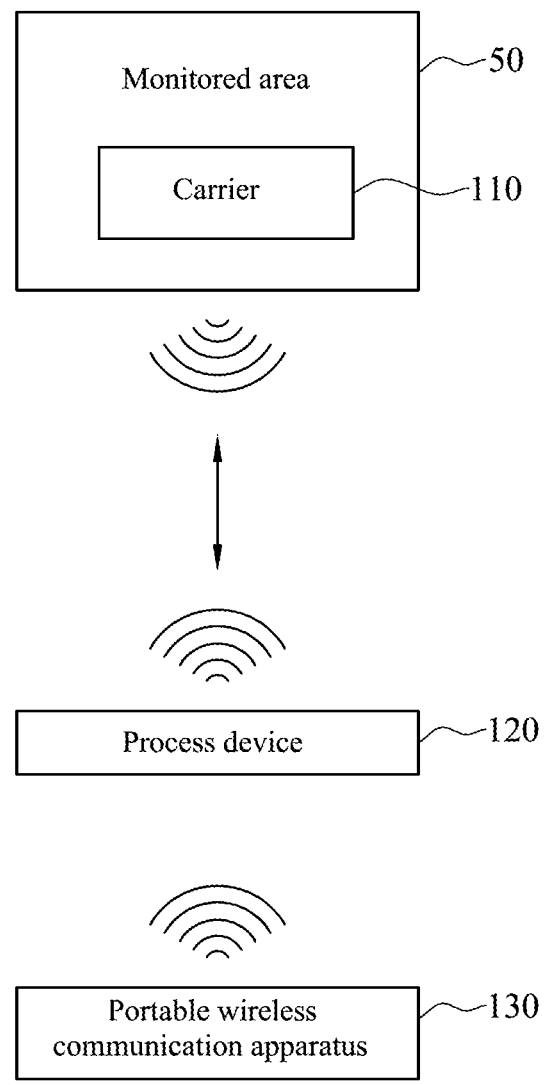
FIG. 1 is a schematic view of a preferred system for real-time monitoring carriers in accordance with the present invention.

Referring now to FIG. 1, a schematic view of a preferred system for real-time monitoring carriers in accordance with the present invention is shown. In this embodiment, the system for real-time monitoring carriers 100, applied to monitor a monitored area 50, includes a carrier 110, a process device 120, a portable wireless communication apparatus 130 and a charging station 140.

The monitored area 50 can be an indoor room, and the carrier 110 can be an indoor robot such as, but not limited to, a robotic cleaner equipped with a dust-collecting device for an indoor cleaning purpose. The carrier 110 in the monitored area 50 is movable in the monitored area 50.

The process device 120 is signally coupled with the carrier 110 via wireless transmission. Namely, a message flow of wireless transmission is established between the carrier 110 and the process device 120. In the present invention, the wireless transmission can be a wireless communication established by a wireless fidelity (WiFi), a Bluetooth, a wide band code division multiple access (WCDMA), a near field communication (NFC), a radio frequency identification (RFID), a long term evolution (LTE) or any wireless communication protocol the like.

The portable wireless communication apparatus 130 can be a handhold communication device, a GPS receiver or a tablet computer. The portable wireless communication apparatus 130 is signally coupled with the process device 120 via wireless transmission. Namely, a message flow of wireless transmission is established between the portable wireless communication apparatus 130 and the process device 120. In the present invention, the wireless transmission can be a wireless communication established by a wireless fidelity (WiFi), a Bluetooth, a wide band code division multiple access (WCDMA), a near field communication (NFC), a radio frequency identification (RFID), a long term evolution (LTE) or any wireless communication protocol the like. Upon such an arrangement, the portable wireless communication apparatus 130 can manipulate the carrier 110 through the process device 120, and the user can manipulate the carrier 110 by controlling the portable wireless communication apparatus 130.

Figure 2:
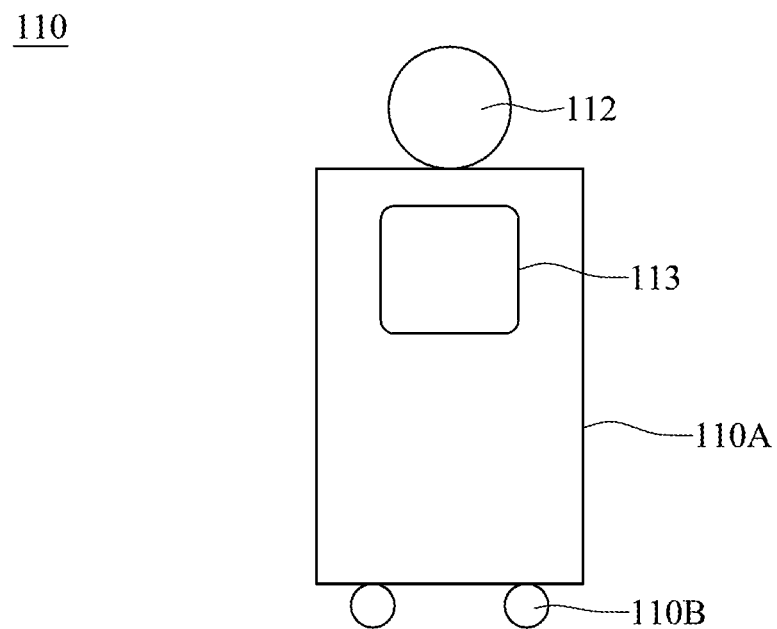
FIG. 2 is s schematic view of the carrier of FIG. 1.
Figure 3:
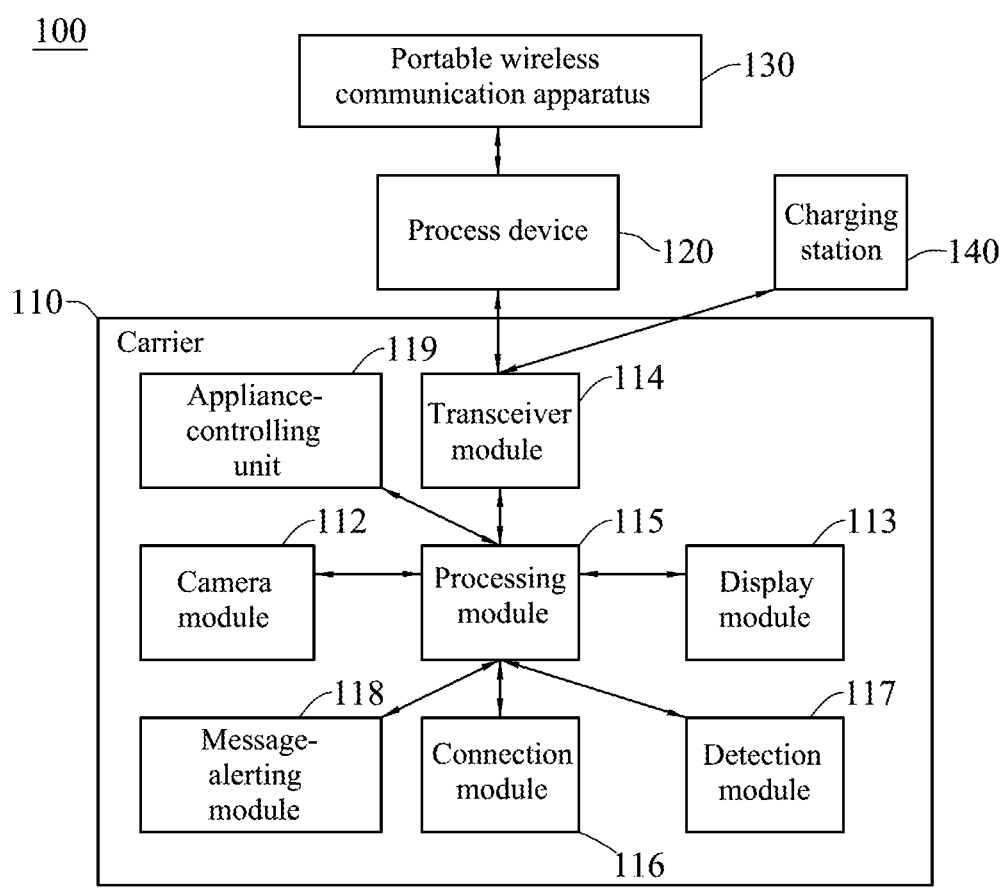
FIG. 3 is a schematic block view of FIG. 1.

Refer now to FIG. 2 and FIG. 3; where FIG. 2 is s schematic view of the carrier of FIG. 1, and FIG. 3 is a schematic block view of FIG. 1. As shown, the carrier 110 includes a main body 110A, a drive module 110B, a camera module 112, a display module 113, a transceiver module 114, a processing module 115, a connection module 116, a detection module 117, a message-alerting module 118 and an appliance-controlling unit 119; in which the camera module 112, the display module 113, the transceiver module 114, the connection module 116, the detection module 117, the message-alerting module 118 and the appliance-controlling unit 119 are individually connected with the processing module 115. The processing module 115 can be a central processing unit (CPU), a microprocessor (μP), a microcontroller (μC), a digital signal processor (DSP) or any the like.

The camera module 112 is located on a top of the main body 110A, while a bottom of the main body 110A is connected with the drive module 110B. The drive module 110B can include a motor, walk wheels and related drive/transmission components for walking the main body 110A of the carrier 110. The display module 113 is located exteriorly to a front side of the main body 110A, and includes a display panel for message displaying. In some other embodiments, the display module 113 can further include a touch panel for user accessing conveniently.

The camera module 112 is to capture images in the monitored area 50. In the present invention, the camera module 112 can be, but not limited to, any type of image-sensing module such as a charge coupled device (CCD) and the like. In practice, the camera module 112 can include an image-capturing device and a microphone located at a top portion of the carrier 110 for recording images around the carrier 110.

The transceiver module 114 selectively issues a power command, a charging command, an image command or an error command to the portable wireless communication apparatus 130.

In one applicable embodiment, since the carrier 110 integrates the drive module 110B for moving and the camera module 112 for recording, hence the imaging angles and positions are thus not strictly restricted. Also, through predetermined setting in tracking and scheduling, the camera module 112 can track specific objects to work and record images simultaneously.

The display module 113 for displaying messages allows a remote user to process video communication or information transmission through the carrier 110. For example, images recorded by the camera module 112 can be transmitted to the display module 113 via the processing module 115, so that the remote user can watch the recorded images. The display module 113 can further include a touch panel for enhancing user convenience. In addition, the transceiver module 114 can issue an image command to the portable wireless communication apparatus 130. When the portable wireless communication apparatus 130 receives the image command, a screen of the portable wireless communication apparatus 130 can display the images of the monitored area 50 captured by the camera module 112, such that the remote user can use the portable wireless communication apparatus 130 to watch the images around the carrier 110 ins areal-time manner.

In this embodiment, the connection module 116 of the carrier 110 can be a WIFI-networking module, so that a message flow between the carrier 110 and the process device 120 can be established in a wireless transmission manner. Thereupon, the user can introduce relevant application problems (APP) built-in the portable wireless communication apparatus 130 to manipulate the carrier 110.

Practically, the portable wireless communication apparatus 130 can utilize the process device 120 to issue a move signal to the carrier 110. Namely, the remote user can control the portable wireless communication apparatus 130 to send a move signal to the process device 120, and then the process device 120 can forward the move signal to the transceiver module 114 of the carrier 110. When the transceiver module 114 of the carrier 110 receives the move signal from the portable wireless communication apparatus 130, the transceiver module 114 would forward the move signal to the processing module 115, such that the processing module 115 can issue a drive message accordingly to the drive module 110B for walking the carrier 110.

On the other hand, the portable wireless communication apparatus 130 of the present invention can apply the process device 120 to issue a termination signal to the carrier 110. As the carrier 110 receives the termination signal, the process device 120 can stop the carrier 110 accordingly.

Further, in one application, when the carrier 110 stops, the process device 120 can access the camera module 112 to capture the images of the monitored area 50, so that the remote user can use the portable wireless communication apparatus 130 to download the images of the monitored area 50 captured by the accessed camera module 112. Thereby, states of the carrier 110 for a recent period of time can be monitored. If the carrier 110 is moved anyhow, the images can be used to tell the instant position of the carrier. Of course, the images of the monitored area 50 captured by the camera module 112 can also be stored in a removable memory card in the carrier 110.

In one application of the present invention, instant images recorded by the moving carrier 110 can be useful for detecting an invasion of foreign objects or persons. For example, by mounting transceivers or transceiver modules 114 with precise address information onto specific windows or doors in the monitored area 50 that are deemed as vulnerable to be broken in, then record these mounting via the portable wireless communication apparatus 130 so as to have the carrier 110 to take pictures or to record if passing these specific locations (aforesaid windows and doors). Upon such an arrangement, if an illegal entrance (thief for example) occurs, the portable wireless communication apparatus 130 with appropriate APPs can inform the user or activate the security system immediately. Also, by providing the images at these specific locations, the invasive time of thieves or illegal persons can be confirmed. Hence, the safety control at the monitored area 50 can be enhanced, and the solution rate of the theft and illegal invasion can thus be increased.

In one application of the present invention, the transceiver module 114 can issue a power command to the portable wireless communication apparatus 130. When the portable wireless communication apparatus 130 receives the power command, the power value of the carrier 110 would be shown in the display screen of the portable wireless communication apparatus 130, and thus the user can have a better understanding the dump power of the carrier 110.

If the power of the carrier 110 is insufficient, the transceiver module 114 would issue a charging command to the portable wireless communication apparatus 130. Then, the user can manipulate the portable wireless communication apparatus 130 to have the carrier 110 to undergo a charging process. In this embodiment, the portable wireless communication apparatus 130 can apply the process device 120 to issue a turn-back signal to the carrier 110 so as to drive the carrier 110 back to the charging station 140. In addition, a time-threshold value can be set to the carrier 110. When the time needed for the carrier 110 to walk back to the charging station 140 exceeds the time-threshold value, carrier 110 would stop immediately. Then, the camera module 112 would be activated to take pictures of or record the surroundings of the carrier 110, such that the user can have the portable wireless communication apparatus 130 to download the images captured by the camera module 112. Thus, the user can easily locate the carrier 110 which might have met a problem of finding no way or a shorter way back to the charging station 140.

Further, in one application of the present invention, a power-threshold value is set to the carrier 110. When the power of the carrier 110 is lower than the power-threshold value, the camera module 112 would be activated to take pictures of or record the surroundings of the carrier 110, such that the user can have the portable wireless communication apparatus 130 to download the images captured by the camera module 112. Thereby, the carrier 110 can be located in a shorter time.

In one application of the present invention, when the carrier 110 meets a situation of the drive module 110B (the walk wheels for example) entangling the cables, the carrier 110 hitting an object, the dust-collecting box of the carrier 110 being full, the carrier 110 accidentally leaving the floor or any the like, the transceiver module 114 would issue an error command to the portable wireless communication apparatus 130 so as to alert the user to respond in time.

In this embodiment, the carrier 110 can include a detection module 117 for monitoring the environment of the monitored area 50 and sending environment-monitoring information to the process device 120. The process device 120 further stores the environment-monitoring information to the appropriate APPs in the portable wireless communication apparatus 130 so as to provide the user with the environment-monitoring information of the monitored area 50, and further to ensure a safety environment in the monitored area 50. It shall be explained that the detection module 117 of the present invention is not limited to the aforesaid embodiment. Generally, the detection module of the present invention can be at least one of an infrared detector, a pH-value detector, a conductivity detector, a temperature sensor, a turbidity detector, an air-pollution detector, a flow detector, a humidity detector, a chemical oxygen gauge, a level meter and a pressure detector. The determination of the type of the replaceable detection module is dependent on the environmental requirements in the monitored area 50, for detecting environment-monitoring information such as carbon monoxide, carbon dioxide, formaldehyde, temperature, humidity and so on.

In this embodiment, the carrier 110 can further include a message-alerting module 118. The portable wireless communication apparatus 130 issues a message-alerting command, and the message-alerting command is then sent to the carrier 110 via the process device 120 so as to activate the message-alerting module 118 of the carrier 110.

Practically, in one application of the present invention, the user can manipulate the portable wireless communication apparatus 130 to issue a message-alerting command containing a cleaning schedule to the carrier 110 via the process device 120. Then, the transceiver module 114 receives the message-alerting command having the cleaning schedule, and the message-alerting module 118 forwards a drive message to the drive module 110B, via the processing module 115, so as to drive the carrier 110 to work till the corresponding cleaning task is complete.

In one application of the present invention, the user can configure any event to be alerted by the carrier 110. For example, the user can apply the portable wireless communication apparatus 130 to issue a message-alerting command for the time to take medicine, and the process device 120 would forward the message-alerting command for the time to take medicine to the carrier 110. As the transceiver module 114 of the carrier 110 receives the message-alerting command for the time to take medicine, then the message-alerting module 118 would apply the processing module 115 to issue the message-alerting command for the time to take medicine to the drive module 110B. Thus, when the time to take medicine is reached, the message-alerting module 118 of the carrier 110 would be activated to alert the user to take medicine, preferably in a verbal manner.

In this preferred embodiment, the carrier 110 further includes an appliance-controlling unit 119. The portable wireless communication apparatus 130 can issue a manipulation command, and the manipulation command goes through the process device 120 and then reached the carrier 110 to activate the appliance-controlling unit 119 of the carrier 110. At the same time, the appliance-controlling unit 119 can drive the carrier 110 to issue an infrared signal to turn off an appliance in the monitored area 50. Thereupon, the user can apply the portable wireless communication apparatus 130 and further the carrier 110 to turn off the appliance. Hence, no more remote control is needed for the appliance, and usage convenience of the whole system for real-time monitoring carriers can be significantly enhanced.

In addition, in one application of the present invention, the carrier 110 can further include a voice apparatus (a microphone and a speaker for example), and the portable wireless communication apparatus 130 can also include a corresponding voice device (a microphone and a speaker for example), such that a talk connection between the voice apparatus and the voice device can be established. Thus, usage variety of the present invention can be increased.

In summary, by providing the system for real-time monitoring carriers of the present invention, the portable wireless communication apparatus can be used to manipulate the carrier, and information of the carrier can be transmitted to the portable wireless communication apparatus through the process device, such that bidirectional communication for real-time monitoring can be achieved.

In an applicable embodiment, the portable wireless communication apparatus can apply the process device to issue a move signal, a termination signal, a turn-back signal or a recording signal to the carrier, so as to move the carrier, to stop the carrier, to turn the carrier back to the charging station, or to have the carrier to record, respectively.

In an applicable embodiment, the carrier can judge the reality to selectively issue a power command, a charging command, an image command or an error command to the portable wireless communication apparatus. Thereby, the user can use portable wireless communication apparatus to monitor the power of the carrier, and to have the carrier to turn back to the charging station for recharging in time. Also, if the carrier finds out that its own power is insufficient, the carrier can automatically issue a charging command to alert the user, so that the user can apply the portable wireless communication apparatus to have the carrier to turn back for recharging, and thus power shutdown to the carrier can be avoided. Further, if the power level of the carrier is to low or a charging station can't be located, the carrier can be stopped firstly, and then the camera module of the carrier would record the surrounding images so as to help the user to resolve the problem quickly.

In addition, the user can use the image command issued by the carrier to watch the images captured by the carrier, so that, when the user receives an error command from the carrier, he or she can immediately handle possible abnormal situations such as the carrier entangling the cable, the carrier hitting an object, the dust-collecting box being full, the carrier being raised to leave the floor or any the like.

In an applicable embodiment, the carrier can use the detection module to monitor the environmental states in the monitored area, so that the carbon monoxide, carbon dioxide, formaldehyde, temperature, humidity and any environment-monitoring information the like can be monitored in a real-time manner, and thus the environment safety in the monitored area can be ensured.

In an applicable embodiment, the user can apply the portable wireless communication apparatus to manipulate the carrier to turn off the appliance, and thus no more remote control is needed for turning off the appliance, such that overall convenience of the system for real-time monitoring carriers can be enhanced.

In an applicable embodiment, the user can configure any event to be alerted by the carrier, such as a message-alerting command for the time to take medicine. Also, the user can apply the portable wireless communication apparatus to issue a message-alerting command for the carrier to perform a fixed cleaning schedule.

In an applicable embodiment, when the carrier is stopped, the process device can access the images of the monitored area captured by the camera module, so that the user can use the portable wireless communication apparatus to download these images and thereby to inspect the state of the carrier, and to further judge the instant location of the carrier. In addition, the images of the monitored area captured by the camera module can be stored in a removable memory card built in the carrier, and the user can fetch the memory card from the carrier for further inspection if necessary.

In an applicable embodiment, the user can preset the carrier to record images at some specific locations. Thereupon, these images at the specific locations can help the user to judge if an illegal invasion occurs. In the case that a thief or an illegal person enters the monitored area through some specific locations (windows for example), then the portable wireless communication apparatus with appropriate APPs can inform the user in time or can activate a security system. Further, by having the images captured by the carrier to reveal the exact time of the illegal entrance, the safety control at the monitored area can be enhanced, and the solution rate of the theft or the invasion can thus be increased.

While the present invention has been particularly shown and described with reference to a preferred embodiment, it will be understood by those skilled in the art that various changes in form and detail may be without departing from the spirit and scope of the present invention.

What is claimed is:

1. A system for real-time monitoring a monitored area, comprising:
   a movable carrier, located in the monitored area, comprises:
      a drive module for moving the movable carrier;
      a camera module;
      a transceiver module; and
      a processing module;
      wherein the camera module and the transceiver module are individually connected with the processing module;
   a process device, electrically coupled with the movable carrier via wireless transmission; and
   a portable wireless communication apparatus, electrically coupled with the process device via wireless transmission, wherein the portable wireless communication apparatus applies the process device to manipulate the movable carrier;
   wherein the camera module is for capturing images of the monitored area and storing images in a removable memory card in the movable carrier, the transceiver module is for selectively issuing one of a power command, an image command and an error command to the portable wireless communication apparatus;

wherein when the portable wireless communication apparatus receives the power command, a power value of the movable carrier is shown on a display screen of the portable wireless communication apparatus;

wherein when the portable wireless communication apparatus receives the image command, the portable wireless communication apparatus displays the images of the monitored area captured by the camera module;

wherein when the power value of the movable carrier is lower than a power-threshold value required for returning back to a charging station, the camera module is activated to take pictures or record surroundings of the movable carrier and the transceiver module issues the image command for locating the movable carrier via images of the monitored area displayed on the portable wireless communication apparatus; and wherein when the portable wireless communication apparatus receives the error command, the camera module is activated to take pictures or record surroundings of the movable carrier and the transceiver module issues the image command for identifying an error situation via images of the monitored area displayed on the portable wireless communication apparatus.

2. The system of claim 1, wherein the portable wireless communication apparatus applies the process device to issue one of a move signal and a termination signal to the movable carrier; wherein, when the movable carrier receives the move signal, the process device drives the movable carrier to move; wherein, when the movable carrier receives the termination signal, the process device controls the movable carrier to stop.

3. The system of claim 2, wherein, when the movable carrier stops, the process device accesses the images of the monitored area captured by the camera module.

4. The system of claim 1, further including a charging station, wherein the portable wireless communication apparatus applies the process device to issue a turn-back signal to the movable carrier for driving the movable carrier to turn back to the charging station.

5. The system of claim 1, wherein the portable wireless communication apparatus applies the process device to issue a recording signal to the movable carrier for driving the camera module of the movable carrier to capture images.

6. The system of claim 1, wherein the movable carrier includes a detection module for monitoring an environment state of the monitored area and for sending environment-monitoring information to the process device, the process device further storing the environment-monitoring information to the portable wireless communication apparatus.

7. The system of claim 1, wherein the movable carrier includes an appliance-controlling unit, the portable wireless communication apparatus issuing and sending a manipulation command to the movable carrier via the process device so as to activate the appliance-controlling unit of the movable carrier.

8. The system of claim 1, wherein the movable carrier includes a message-alerting module, the portable wireless communication apparatus issuing and sending a message-alerting command to the movable carrier via the process device so as to activate the message-alerting module of the movable carrier.

* * * * *